United States Patent [19]

Bishai et al.

[11] 4,176,974

[45] Dec. 4, 1979

[54] INTERACTIVE VIDEO DISPLAY AND EDITING OF TEXT IN THE ARABIC SCRIPT

[75] Inventors: Wilson B. Bishai, Stoneham; John H. McCloskey, Cambridge, both of Mass.

[73] Assignee: Middle East Software Corporation, Cambridge, Mass.

[21] Appl. No.: 886,276

[22] Filed: Mar. 13, 1978

[51] Int. Cl.² .................................................. B41J 0/00
[52] U.S. Cl. ..................................... 400/111; 400/63; 400/83; 364/900
[58] Field of Search ................... 400/63, 83, 109, 110, 400/111; 364/900

[56] References Cited

U.S. PATENT DOCUMENTS

| | | | |
|---|---|---|---|
| 2,940,575 | 6/1960 | Khalil | 400/111 |
| 3,248,705 | 4/1966 | Dammann et al. | 400/83 X |
| 3,513,968 | 5/1970 | Hanson | 400/111 X |
| 3,780,846 | 12/1973 | Kolpek et al. | 400/63 |
| 3,938,099 | 2/1976 | Hyder | 400/111 X |
| 3,998,310 | 12/1976 | Chaudhry | 400/111 |
| 4,124,843 | 11/1978 | Bramson et al. | 400/83 X |

Primary Examiner—Ernest T. Wright, Jr.

[57] ABSTRACT

A system, and related process, for mechanical reproduction of Arabic script is characterized by immediate response to user input and by full conformity to the ordinary calligraphic rules of the Arabic language. The process involves temporary storage of text being processed in a variety of coded representations, discrimination of the appropriate form of a given letter in view of its graphic context, and immediate display of the appropriate form on a video monitor. This displayed form may subsequently be erased and replaced by a different form of the same letter conditioned by subsequent user input. The user is also enabled to delete previously entered characters, with appropriate modification of the other characters presently displayed. In general, the Arabic text displayed is immediately updated to reflect each new character of user input, and is always maintained in a state of orthographic correctness.

3 Claims, 5 Drawing Figures

TABLE I — GRAPHEMIC CODE

FIG. 1

| CODE | CHARACTER | CODE | CHARACTER | CODE | CHARACTER | CODE | CHARACTER |
|------|-----------|------|-----------|------|-----------|------|-----------|
| 00 |  | 32 | <SPACE> | 64 |  | 96 | و |
| 01 |  | 33 | ! | 65 | ء | 97 | ؤ |
| 02 |  | 34 | " | 66 | ا | 98 | ي |
| 03 |  | 35 | ≠ | 67 | آ | 99 | ئ |
| 04 |  | 36 | * | 68 | أ | 100 | ىٰ |
| 05 |  | 37 | % | 69 | إ | 101 | ـ |
| 06 |  | 38 |  | 70 | ب | 102 | لا |
| 07 |  | 39 |  | 71 | ت | 103 | لآ |
| 08 | DELETE CHARACTER | 40 | ) | 72 | ث | 104 | لأ |
| 09 |  | 41 | ( | 73 | ج | 105 | لإ |
| 10 |  | 42 | × | 74 | ح | | |
| 11 |  | 43 | + | 75 | خ | | |
| 12 | NEW PAGE | 44 | ، | 76 | د | | |
| 13 | NEW LINE | 45 | — | 77 | ذ | | |
| 14 |  | 46 | . | 78 | ر | | |
| 15 |  | 47 | ÷ | 79 | ز | | |
| 16 |  | 48 | • | 80 | س | | |
| 17 |  | 49 | \ | 81 | ش | | |
| 18 |  | 50 |  | 82 | ص | | |
| 19 |  | 51 |  | 83 | ض | | |
| 20 |  | 52 |  | 84 | ط | | |
| 21 | DELETE LINE | 53 | ○ | 85 | ظ | | |
| 22 |  | 54 |  | 86 | ع | | |
| 23 |  | 55 | ∨ | 87 | غ | | |
| 24 |  | 56 | ∧ | 88 | ف | | |
| 25 |  | 57 | ٩ | 89 | ڤ | | |
| 26 |  | 58 | : | 90 | ك | | |
| 27 |  | 59 | ؛ | 91 | ل | | |
| 28 |  | 60 | > | 92 | م | | |
| 29 |  | 61 | = | 93 | ن | | |
| 30 |  | 62 | < | 94 | ه | | |
| 31 |  | 63 | ؟ | 95 | ة | | |

REMARKS (a) CODES WITH NO CHARACTER SHOWN ARE UNDEFINED, AND ARE IGNORED DURING PROCESSING.
(b) CODE #46 IS PERIOD; #48 IS THE DIGIT ZERO.
(c) CODE #101 IS A CHARACTER EXTENDER, USED TO STRETCH OUT A WORD (OR JUSTIFY A LINE OF TYPE IN ARABIC)

TABLE II — GRAPHETIC CODE (WHERE DIFFERENT FROM GRAPHEMIC) FIG. 2

| CODE | CHARACTER | CODE | CHARACTER | CODE | CHARACTER | CODE | CHARACTER |
|---|---|---|---|---|---|---|---|
| 106 | ل | 139 | ک | 172 | ـر | 205 | ـظ |
| 107 | ل | 140 | کی | 173 | ـز | 206 | ـجـ |
| 108 | ل | 141 | | 174 | ـط | 207 | ـغـ |
| 109 | ل | 142 | لا | 175 | | 208 | ـقـ |
| 110 | ـب | 143 | لا | 176 | | 209 | ـفـ |
| 111 | ـت | 144 | لا | 177 | | 210 | ـکـ |
| 112 | ـث | 145 | لا | 178 | ـپ | 211 | ـلـ |
| 113 | ـج | 146 | | 179 | ـع | 212 | ـمـ |
| 114 | ـح | 147 | | 180 | ـع | 213 | ـنـ |
| 115 | ـخ | 148 | | 181 | | 214 | ـو |
| 116 | ـد | 149 | | 182 | | 215 | |
| 117 | ـذ | 150 | ـر | 183 | | 216 | |
| 118 | ـز | 151 | ـز | 184 | | 217 | |
| 119 | ـر | 152 | ن | 185 | | 218 | ـب |
| 120 | س | 153 | ج | 186 | | 219 | ـت |
| 121 | ش | 154 | ح | 187 | | 220 | ـک |
| 122 | ص | 155 | خ | 188 | | 221 | |
| 123 | ض | 156 | | 189 | | 222 | |
| 124 | ط | 157 | | 190 | ـب | 223 | |
| 125 | ظ | 158 | | 191 | ـت | 224 | |
| 126 | ع | 159 | | 192 | ـث | 225 | |
| 127 | غ | 160 | س | 193 | ـج | | |
| 128 | ق | 161 | ش | 194 | ـح | | |
| 129 | ف | 162 | ص | 195 | ـخ | | |
| 130 | ک | 163 | ض | 196 | | | |
| 131 | ل | 164 | ط | 197 | | | |
| 132 | م | 165 | ظ | 198 | | | |
| 133 | ن | 166 | ع | 199 | | | |
| 134 | ه | 167 | غ | 200 | ـس | | |
| 135 | ة | 168 | ق | 201 | ـش | | |
| 136 | و | 169 | ف | 202 | ـص | | |
| 137 | ى | 170 | ک | 203 | ـض | | |
| 138 | ی | 171 | ل | 204 | ـط | | |

REMARKS:
(a) CODES 00 THROUGH 105 IDENTICAL WITH THOSE GRAPHEMIC CODES.
(b) 66–105 ARE INDEPENDENT FORMS; 106–145 ARE FINAL FORMS; 146–185 ARE INITIAL FORMS; 186–225 ARE MEDIA FORMS.

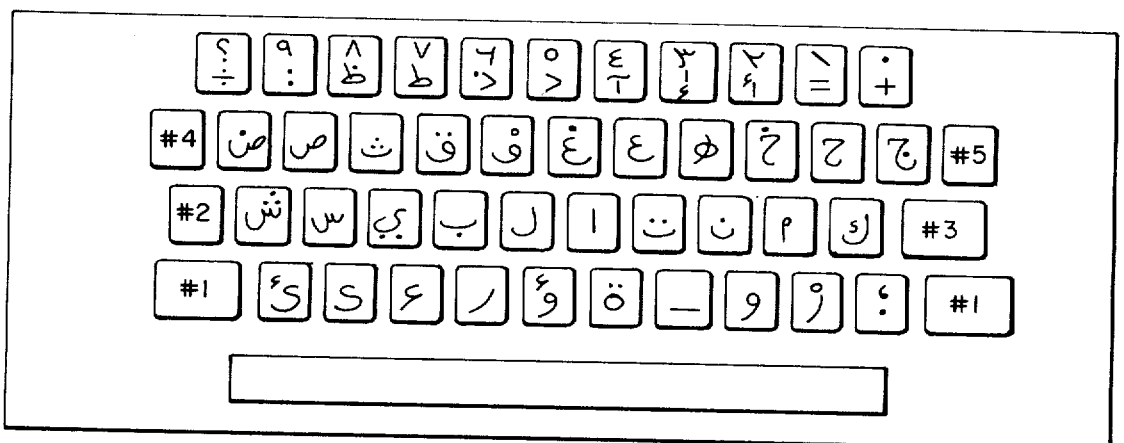
FIG. 3
1 SHIFT
2 DELETE CHARACTER
3 NEW LINE
4 DELETE LINE
5 NEW PAGE
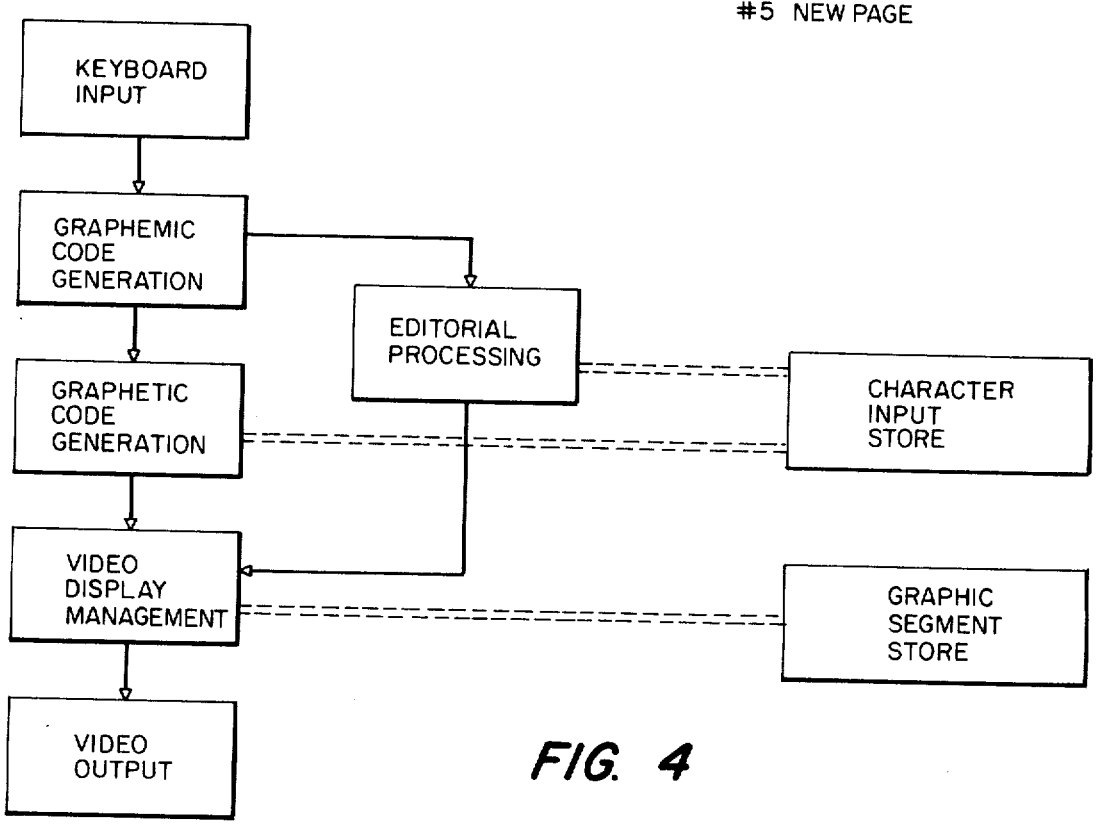
FIG. 4
SAMPLE OF ARABIC LETTERS WITH SPACES
لبنان موجود فى الشرق الاوسط
SAMPLE OF THE SAME LETTERS WITHOUT SPACES
لبنان موجود فى الشرق الاوسط
FIG. 5

INTERACTIVE VIDEO DISPLAY AND EDITING OF TEXT IN THE ARABIC SCRIPT

FIELD OF THE INVENTION

The invention relates to the preparation of textual material in the Arabic script and language. The process is applicable to video communications systems, printing devices, typewriters, teletypewriters, and terminals for typesetting and data processing systems.

BACKGROUND OF THE INVENTION

The Arabic script is written from right to left and is essentially and obligatorily cursive: letters are horizontally linked to one another without the intervening blank spaces customary in the printing of European languages. The writing of Arabic in a simplified form involving the intrusion of such spaces has been implemented in order to facilitate the use of equipment and procedures originally designed for Western languages, but the results are invariably unacceptable from an esthetic point of view. To achieve a tolerable compliance with the ordinary calligraphic style, a variety of shapes must be provided for most letters of the alphabet. This is done, for instance, on the usual Arabic typewriter keyboard. Of course the selection of the appropriate form of each letter devolves upon the typist, even though this choice is completely determined by the orthographic context, specifically, by the immediately preceding and the immediately following character. This implementation necessitates a multiplication of the number of keys and so results in a reduction of typing speed, especially since many of the variant shapes are on shifted keys. (The Arabic script does not have the upper-case vs. lower-case distinction of Western typography). In any case, Arabic typewriters must reduce the inventory of variant forms to limit the size of the keyboard, and this results in a definite degradation of the quality of the Arabic script produced, as judged by the standards of either traditional manual calligraphy or full-scale typographic composition.

A further problem is that the shape assumed by most letters depends on the following character, which cannot be known in advance. Usually one must know what character follows the present one before one can draw it correctly. Hence a lag in response to the user is introduced in those few proposed systems where an effort is made to relieve the typist of the task of selecting the particular form of each letter as well as the letter itself.

In summary, existing devices suffer from one or more of the following drawbacks:

(1) calligraphically poor output due to over-simplification of the cursive script;

(2) imposition on the user of the (unnecessary) task of selecting the particular context-determined form of each letter;

(3) delay in response to user input when subsequent context is unknown.

SUMMARY OF THE INVENTION

The object of this invention is to provide an improved facility for preparing records and documents in the Arabic script by eliminating the three drawbacks of existing methods noted above. Thus, it is an object of this invention to provide a highly acceptable quality of Arabic script in a video output medium, in accordance with the traditional norms of Arabic calligraphy.

It is a further object of this invention to relieve the typist of the burden of selecting positional character variants, and thus to improve his typing speed and simplify the keyboard needed to prepare Arabic text.

It is a further object of this invention to allow the user immediate interaction with the display, so that each letter of input is at once displayed in an orthographically correct form, without the lag mentioned above.

It is yet a further object of this invention to allow the user a modicum of ability to edit and correct previously typed letters in an interactive fashion, automatically maintaining the video display in a state of orthographic correctness at all times.

These objects of the invention are attained by incorporating the following elements in a total system dedicated to the task in hand:

(1) a device for receiving typed input from a specially designed Arabic keyboard;

(2) a conventional coded representation of the Arabic script elements in Arabic alphabetical order, but without regard to their variant shapes;

(3) a second conventional coded representation differing from the first by incorporating this information on positional variants;

(These codes will here be referred to as "graphemic" and "graphetic" representations of Arabic script respectively, by analogy with the well-known linguistic distinction between "phonemic" and "phonetic" representations of speech).

(4) a discrimination procedure for converting the graphemic representation of an item to its graphetic counterpart in view of the graphic context;

(5) an inventory of character elements representing letters or other elements of the Arabic script, or parts of such elements, stored in a digital form suitable for output to a conventional video monitor;

(6) a procedure for selecting the appropriate script elements of (5) to correspond to the graphetic code representation of a character as chosen in (4), and displaying these elements on the output video medium.

DETAILED DESCRIPTION OF A PREFERRED EMBODIMENT

The invention may be best understood from the following detailed description thereof, having reference to the accompanying drawing in which:

FIG. 1 is a table illustrating a representative graphemic code which may be used in accordance with the invention;

FIG. 2 is a table illustrating a representative graphetic code suitable for use with the invention;

FIG. 3 is a somewhat diagrammatic plan view of a key board suitable for use in one embodiment of the invention;

FIG. 4 is an illustration in block diagrammatic form of one embodiment of a control system suitable for carrying out the principles of the invention; and FIG. 5 is a diagram showing a typical video display of an Arabic script text in accordance with the invention.

The invention is realized in a tripartite overall system consisting of an input medium, a display processor, and an output (or display) medium, which will be discussed in turn.

Input Medium

The input medium consists of a keyboard or multiple keyboards having keys labelled with the Arabic script letters, numbers, and other graphic symbols. Only the basic or independent form of the context-sensitive Arabic letters are present, and the result is a configuration rather different from the ordinary Arabic typewriter keyboard which, as mentioned above, must also contain a large number of variant (non-independent) forms for each of these letters. A representative arrangement of one form of keyboard suitable for use in carrying out the invention is shown in FIG. 3. However, it is to be understood that the invention is not limited to the configuration shown in FIG. 3, but includes various configurations, provided that in accordance with the invention the keyboard need only include keys for the basic form of each of the Arabic letters in the Arabic alphabet.

The keyboard is of a type well known in the art, and generates a seven- (or eight-) bit binary output when a key is depressed, according to well-known standardized codes. Since, however, existing devices of this nature are standardized for English or other Latin-script languages, it is necessary to convert their binary output to the Arabic standard graphemic code adopted here. It is to be noted that there is a one-to-one correspondence between the keys of the input device and the items of the graphemic code.

Display Processor

The display processor receives the input character from the keyboard (as decoded into the graphemic code) and modifies the output display in accordance with this input.

The graphemic code is listed in FIG. 1 under the heading "Table I". It is important to note that it falls into three parts:

(a) 0 to 31—these are, by analogy with correct standard coding systems, reserved for special control functions, such as line feed and carriage return on a teletypewriter.

(b) 32 to 64—the second group of codes consists of items that have only one possible representation in Arabic script, i.e., that are not context-sensitive (numbers and punctuation).

(c) 65 to 225—the highest number group of codes represent the context-sensitive graphic items, and consist of the Arabic alphabet in the ordinary Arabic alphabetic order.

The assignment of the highest numbered codes to the context-sensitive items is necessary in view of the particular correspondence here adopted between the graphemic and the graphetic representations of the same item; specifically, it is desirable that the two representations be identical for all non-context-sensitive items.

The receipt of a character in the first two groups will ordinarily result in immediate display of the appropriate graphic output, since there is no dependence on the previous state of the video display. As noted, the conversion to "graphetic" code is trivial, since the two systems correspond for such characters. The conversion of the graphetic code to actual video output is the same as for context-sensitive items, as explained below. The conventions adopted for the execution of such control functions as "new line", and "new page" are similar to those well-known in connection with ordinary Latin-script alphanumeric cathode-ray-tube (CRT) displays.

The editorial functions, "delete character" and "delete line" may be considered in more detail. Their implementation depends upon temporary storage of user input; this storage comprises, as a minimum, the contents of the single line of text presently being processed in a binary representation based on the graphemic character codes. "Delete line" is then executed by discarding the contents of this temporary store (as also occurs in execution of the "new line" or "new page" functions) and, in addition, replacing the entire current line of video output with blank characters. "Delete character" is most simply implemented by (a) removing the last character of this temporary store (if any), (b) blanking out the line in toto, and (c) redrawing the display from the beginning of the line (without the former last character). Thus the single input "delete character" is exactly equivalent to inputting "delete line" followed by the whole contents of the current line, minus the last character. The result, from the user's point of view, is that the the last Arabic letter is removed, and the preceding one, which is now in effect in final position, is rewritten in its proper calligraphic form for the altered context. The user always sees exactly what characters he has typed without any delay, and can always remove one or more misstruck characters; repeated input of "delete character" will remove any number of characters from the display in reverse order of their original entry, until the line is entirely empty, in which case the inputs "delete line" and "delete character" have, of course, no effect on the video display.

Given an input character in the third category, however, the execution is more complicated and will in many cases require that the preceding character, already displayed as if in final position in a word, be erased and redrawn in a non-final variant linked to the new character. Of course, this new character will itself be initially displayed as if it were final, though further input may well cause it, too, to be erased and redisplayed in a non-final variant.

In the usual presentation of the Arabic script, it is regarded as the norm for a letter to connect both backwards (to the right) and forwards (to the left) to adjoining letters. There is, however, a small sub-class of alphabetic letters which may connect backwards (rightwards) only, never forwards; and, as already discussed, a considerable number of non-alphabetic symbols (numerals and punctuation) which may link neither backwards nor forwards. For a linkage of two characters actually to occur, it is necessary that the first of them may link forwards and the second may link backwards. But if both are permitted to link in the appropriate direction, the two must be joined. This is required by the rules of the script and is not in the discretion of the writer, i.e., Arabic does not allow "printing" as opposed to "handwriting" in the fashion of Western languages.

Hence letters that may link in both directions occur in actual text in four different variants:

(1) independent—joined neither right nor left
(2) final—joined rightwards only
(3) initial—joined leftwards only
(4) medial—joined both rightwards and leftwards
   Those letters that may join rightwards only can appear only in independent and final variants, and non-alphabetic items are all restricted to one unique independent form. This terminology allows statement of the heart of this diplay process, namely,

The Cursive Script Algorithm

Step 1: Obtain the next character

Step 2: If this character does not link backwards, display its independent form and stop Step 3: Otherwise, consider the preceding character (i.e., the last one currently displayed). If this preceding character may not link forwards display the new character in its independent form and stop Step 4: Otherwise, erase the preceding character, since it must be redrawn in a forwards-linking variant.

Step 5: If the character before the newly erased one may link forwards, redraw the erased one in its medial variant, otherwise it its initial variant Step 6: Display the newly obtained character in its final variant and stop.

This formulation is entirely abstract, and its implementation must be discussed step-by-step. Step 1 has already been covered—the graphemic representation of the new character has been obtained from the keyboard and added to the temporary storage list needed to implement the editing functions.

Step 2: whether the character links backwards can be determined by comparing its graphemic code with that of the lowest character known to link backwards. Because of the structure chosen for the graphemic code, all lower codes do not so link, all equal or higher codes do. The procedure for display of a form once shosen will be covered below.

Step 3: the graphemic representation of the preceding character is available in the temporary store, which, incidentally, must contain one null (graphemic code zero) character preceding the first character of user input; this item represents the logical character "beginning of line", which, of course, prohibits the following character from connecting backwards/rightwards. Arabic words may not be hyphenated and split between two lines of text. Given the graphemic code for the preceding character, we first compare it, as in step two, with the code of the first code known to link backwards. If it is lower, it does not link forwards, either, since there is no class of forwards-but-not-backwards-linking graphemes. However, if it does link forwards, we must compare it with a stored exception list of graphemic codes which link backwards only. This check cannot be simplified to a single numerical comparison without abandoning the simple correspondence between the sequence of the graphemic code values and the received alphabetical order of the Arabic letters, since the backwards-but-not-forwards-linking letters are not contiguous in the ordinary alphabet.

Step 4: the preceding character is erased by displaying a blank character or characters in its place. The only complication is that its width must be known, as the Arabic graphic items cannot be reduced to a uniform horizontal spacing without esthetically unacceptable distortion. Consequently, whenever a (temporarily) final character is drawn (as per steps 2, 3, or 6 of the algorithm), the width of its graphic representation is temporarily recorded to make possible its subsequent erasure at this point in processing the next character.

Step 5: the antepenultimate character is examined from the temporary input store according to the procedure outlined for Step 3.

The one point remaining to elucidate the basic cursive script algorithm is how the independent, final, initial, and medial forms are specified to the character display routine (to be outlined below). This is achieved by converting the graphemic code for the given item into the graphetic code. The latter is set out explicitly in FIG. 2 under the heading "Table II", but the general pattern is this:

if X = graphemic code, then

X = graphetic code for independent form

X + N = graphetic code for final form

X + 2N = graphetic code for initial form

X + 3N = graphetic code for medial form where N is the total number of alphabetic (i.e., backwards linkable) characters recognized. This number is 33 for the strictly Arabic implementation described in the tables, but would be somewhat larger to incorporate the additional letters used in such Arabic-derived scripts as Persian (Farsi) or Urdu.

Output Medium

Given that the appropriate positional variant of an input character has been chosen, the preferred realization of this graphic item involves the use of the well-known procedures for creating and maintaining displays of digitally coded data via television, i.e., on a video monitor or monitors of a well-known type. Output of a suitable video medium for use with one embodiment of the invention is shown in FIG. 5. The first Arabic line was produced by depressing a number of keys separated by spaces. The second Arabic line was produced by depressing the same keys without spaces except between words. The result was correct Arabic script.

Each item (graphetic code) to be displayed is first decoded (by table look-up) into one or more units of actual graphic output. Ordinarily, an Arabic character will actually consist of one, two, or three horizontally juxtaposed output units, since, as already noted, the width of letters in the traditional orthography is not uniform and cannot be made uniform without severe distortion. Each graphic output unit may be regarded as a small (e.g., eight horizontal by twelve vertical) binary digital array. It is both a simplification of the output process and an immediate reflection of received rules of Arabic calligraphy that such output segments will very frequently be shared between two or more different letters of the alphabet, and even more frequently will be shared between the positional variants of one given Arabic letter. For this reason, it is an essential element of this display process that actual video output be built up as necessary out of these predefined output segments so as to avoid the storage of a large amount of redundant information common to various Arabic graphic elements.

Once a particular output segment has been chosen for display, either of two well-understood and widely used methods may be adopted to create the video signal proper:

(a) the appropriate binary array may be duplicated in toto in the appropriate location within a much larger binary digital array (in a memory plane) which corresponds as a whole to the screen of the video output unit, and which is continually examined and converted to video signals by an independent video processor, using devices and techniques well known in the art.

(b) a coded index to the specified output segment may be stored in a larger binary array. In this case, a more elaborate video processor (of a type well understood) will reproduce (not the binary digital data in the array it scans but) the separately stored binary digital array corresponding to the indices actually scanned.

In either case, the larger digital binary array is continually reproduced as a video output signal, independently of the other ongoing processes previously described. It should be observed that the "deletion" of a character referred to above actually consists in overwriting the appropriate output segments (or their indices) with blank segments (or indices thereto). Furthermore, since the cursive script algorithm frequently demands the removal of a character already drawn (but always of the character most recently added to the display and never of any other), we must, at the time of displaying each Arabic graphic element, temporarily store its width (i.e., the number of minimal graphic output elements used to realize it) for possible use in subsequently blanking it out, as has been detailed above.

The invention has a wide range of applications in the areas of telecommunications, document preparation, typographic composition, and electronic data processing, and specifically, it will allow and encourage the extension of well-known techniques and procedures in these areas to an Arabic-script environment.

Having thus described the principles of the invention together with an illustrative embodiment thereof it is to be understood that although specific terms are employed they are used in a generic and descriptive sense and not for purposes of limitation, the scope of the invention being set forth in the following claims.

We claim:

1. A process for mechanical reproduction of an Arabic-script text in a highly acceptable esthetic manner conforming to the traditional norms and conventions of that script, specifically in the matter of producing cursive output, comprising the following steps: storing seriatim in a first storage device graphemically coded representations of each of the discrete characters constituting said text, converting said graphemic representations into fuller graphetic coded representations wherein the context-conditioned graphic variation of Arabic letters is recognized, selecting from a second storage device the appropriate digitized graphic output element or elements corresponding to the said graphetic coded representations, and continuously and progressively displaying each new output element on a video medium by first modifying all previously displayed output elements if necessary to conform them to a state of calligraphic correctness on the assumption that the new output element is terminal, and then displaying said new output element on said medium as though it were terminal.

2. A system for mechanical reproduction of Arabic-script letters in a highly acceptable esthetic manner conforming to the traditional norms and conventions of that script, specifically in the matter of producing cursive output, comprising in combination: a keyboard having a key for the basic form of each of the Arabic letters in the Arabic alphabet, a first storage means associated with said keyboard for storing upon activation of any key, a graphemically coded representation of the basic letter corresponding to said key, means for converting said graphemic representation into a fuller graphetic coded representation wherein the context-conditioned graphic variation of Arabic letters is recognized, a second storage device containing the appropriate digitized graphic output element or elements corresponding to each of the graphetic coded representations, a video medium, and means for progressively and continuously displaying each new output element on said video medium including means for modifying as necessary all previously displayed output elements to conform them to a state of calligraphic correctness on the assumption that the new output element is terminal and means for then displaying said new output element on said medium as though it were terminal.

3. A system in accordance with claim 2, including means for enabling the user to delete at his option (a) the entire video display, (b) the line of text currently being added to, (c) the last character reproduced on said current line, with whatever modification of preceding characters may be necessitated by the norms of the script.

* * * * *